(12) United States Patent
Muraoka et al.

(10) Patent No.: US 11,463,369 B2
(45) Date of Patent: Oct. 4, 2022

(54) COMMUNICATION DEVICE, COMMUNICATION METHOD AND COMPUTER READABLE MEDIUM

(71) Applicant: Mitsubishi Electric Corporation, Tokyo (JP)

(72) Inventors: Takafumi Muraoka, Tokyo (JP); Kazuhiro Murayama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/172,842

(22) Filed: Feb. 10, 2021

(65) Prior Publication Data

US 2021/0168057 A1 Jun. 3, 2021

Related U.S. Application Data

(63) Continuation of application No. PCT/JP2018/048014, filed on Dec. 27, 2018.

(30) Foreign Application Priority Data

Aug. 23, 2018 (WO) .................. PCT/JP2018/031135

(51) Int. Cl.
*H04L 47/28* (2022.01)
*H04L 43/106* (2022.01)
(Continued)

(52) U.S. Cl.
CPC ............ *H04L 47/28* (2013.01); *H04L 43/106* (2013.01); *H04L 43/16* (2013.01); *H04L 47/564* (2013.01);
(Continued)

(58) Field of Classification Search
CPC ....... H04L 47/28; H04L 43/106; H04L 43/16; H04L 47/564; H04L 43/0894; H04L 47/6275
See application file for complete search history.

(56) References Cited

U.S. PATENT DOCUMENTS

| 5,706,430 A | 1/1998 | Yanagisawa et al. |
| 8,665,722 B2 * | 3/2014 | Szymanski ........... H04W 28/10 370/235 |

(Continued)

FOREIGN PATENT DOCUMENTS

| CN | 102132535 A | 7/2011 | |
| CN | 108476162 B * | 1/2021 | ............. H04L 12/40 |

(Continued)

OTHER PUBLICATIONS

Zhao, "Worst-Case Latency Analysis for IEEE 802.1Qbv Time Sensitive Networks Using Network Calculus", IEEE Access; Jun. 11, 2018 (Year: 2018).*

(Continued)

*Primary Examiner* — Jerry B Dennison
(74) *Attorney, Agent, or Firm* — Birch, Stewart, Kolasch & Birch, LLP

(57) ABSTRACT

A communication device (10) communicates in a network in which a TSN (Time-Sensitive Networking) technique is used. A time slot management unit (21) notifies that time slots in the TSN technique have been switched. A data receiving unit (23) stores reception data in a reception data storage unit (25) when the reception data received from other communication devices (10) is not transmission data transmitted during a current time slot. When the time slot management unit (21) notifies that the time slots have been switched, the data receiving unit (23) delivers to a reception task (27), the reception data which is the transmission data (Continued)

transmitted during a time slot after being switched and is stored in a reception data storage unit (25).

18 Claims, 14 Drawing Sheets

(51) Int. Cl.
*H04L 43/16* (2022.01)
*H04L 47/56* (2022.01)
*H04L 43/0894* (2022.01)
*H04L 47/6275* (2022.01)

(52) U.S. Cl.
CPC ...... *H04L 43/0894* (2013.01); *H04L 47/6275* (2013.01)

(56) References Cited

U.S. PATENT DOCUMENTS

| | | | |
|---|---|---|---|
| 2003/0046324 A1 | 3/2003 | Suzuki et al. | |
| 2006/0059491 A1 | 3/2006 | Suzuki et al. | |
| 2009/0016217 A1* | 1/2009 | Kashyap | H04L 49/901 370/231 |
| 2011/0134753 A1* | 6/2011 | Kashyap | H04L 49/9063 370/231 |
| 2011/0142052 A1 | 6/2011 | Kulkarni et al. | |
| 2016/0127250 A1* | 5/2016 | McCormick | H04W 56/00 370/235 |
| 2017/0195238 A1* | 7/2017 | Luo | H04L 47/2441 |
| 2018/0191629 A1* | 7/2018 | Biederman | H04W 72/0446 |
| 2019/0322298 A1* | 10/2019 | Mong | H04L 47/24 |
| 2019/0322299 A1* | 10/2019 | Mong | H04L 65/1069 |
| 2019/0386935 A1* | 12/2019 | Back | H04L 49/90 |
| 2021/0014177 A1* | 1/2021 | Kasichainula | H04L 47/6295 |
| 2021/0168057 A1* | 6/2021 | Muraoka | H04L 47/28 |
| 2021/0375129 A1* | 12/2021 | Meng | G08G 1/0133 |
| 2021/0377181 A1* | 12/2021 | Oge | H04L 47/28 |

FOREIGN PATENT DOCUMENTS

| | | | | |
|---|---|---|---|---|
| CN | 108476161 B | * | 3/2021 | ............ H04L 12/40 |
| JP | 7-182293 A | | 7/1995 | |
| JP | 11-32061 A | | 2/1999 | |
| JP | 11-74946 A | | 3/1999 | |
| JP | 2001-285394 A | | 10/2001 | |
| JP | 2001-290662 A | | 10/2001 | |
| JP | 2003-67201 A | | 3/2003 | |
| WO | WO-2019145028 A1 | * | 8/2019 | ........... H04L 47/283 |
| WO | WO-2019224860 A1 | * | 11/2019 | ............ H04L 1/189 |

OTHER PUBLICATIONS

International Search Report for PCT/JP2018/031135 dated Nov. 13, 2018.
International Search Report for PCT/JP2018/048014 dated Feb. 19, 2019.
Office Action dated Sep. 22, 2021 issued in corresponding German Application No. 11 2018 007 845.0 with English Translation.
Office Action dated Jun. 6, 2022 in corresponding Chinese Application No. 201880096712.4.

* cited by examiner

Fig. 11
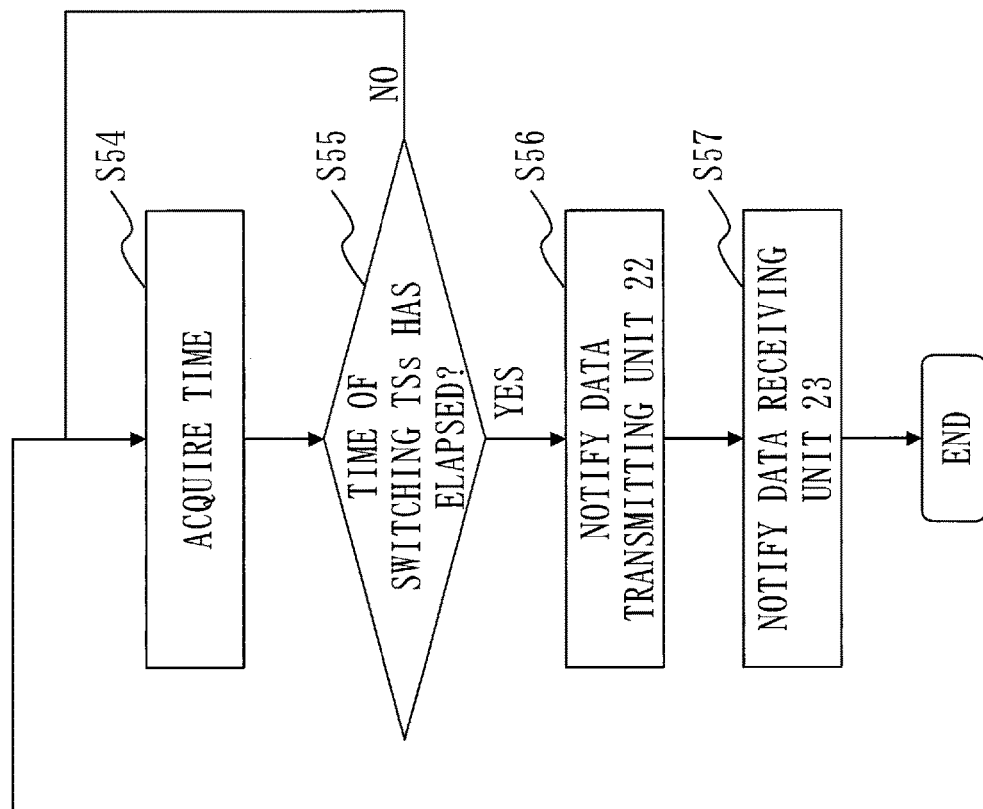
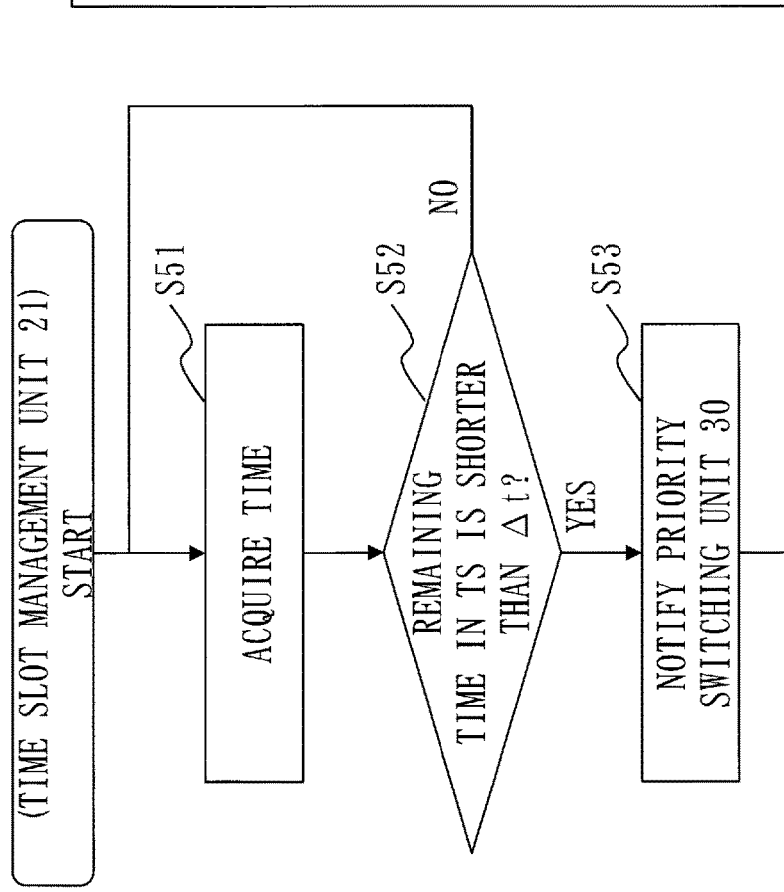

Fig. 13
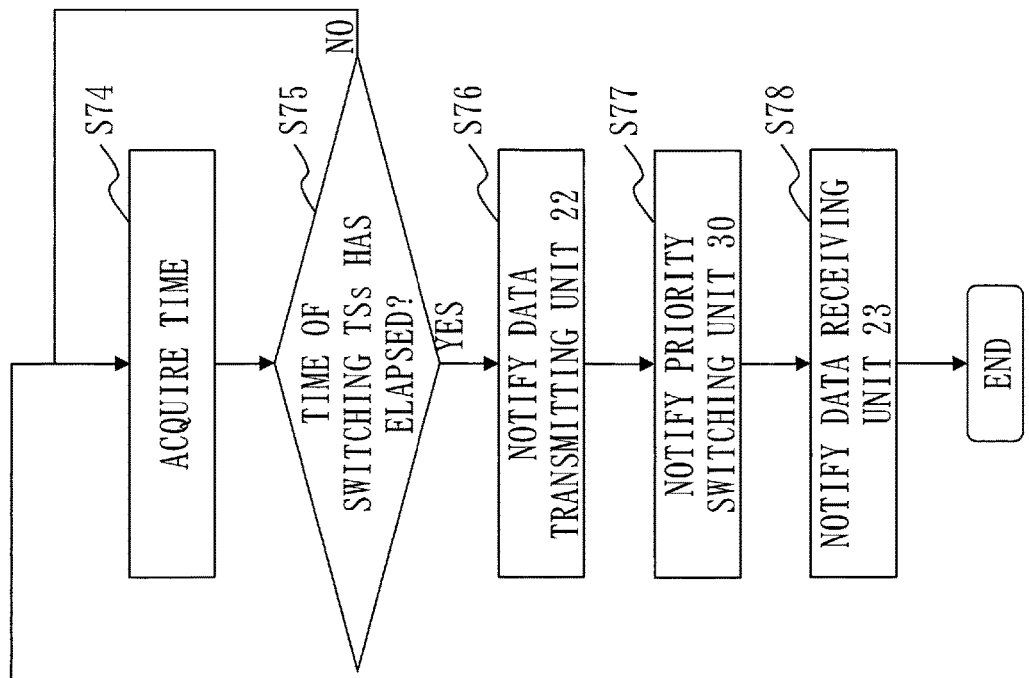
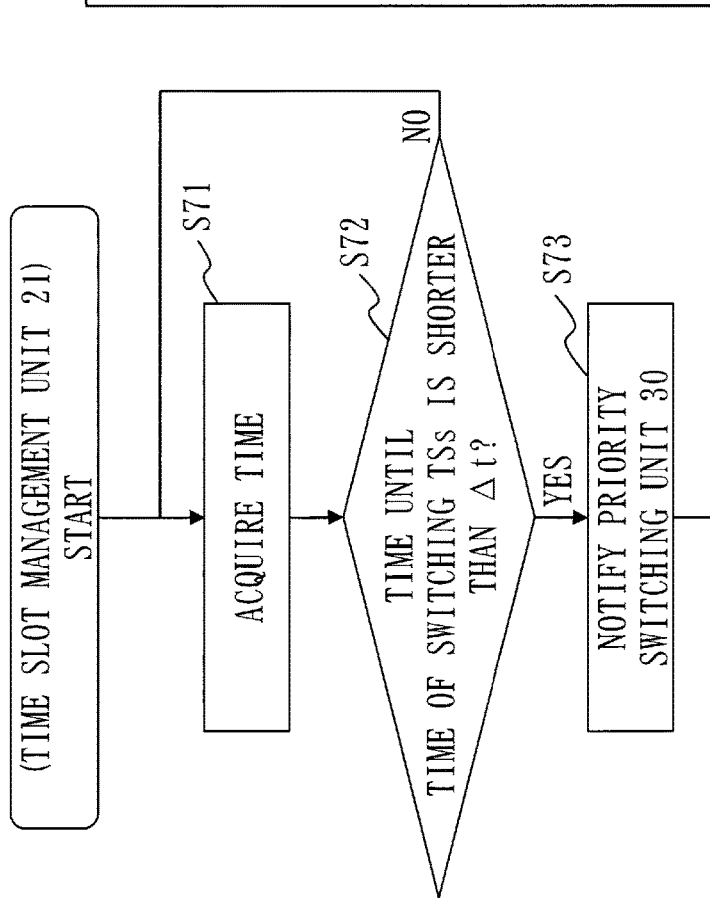

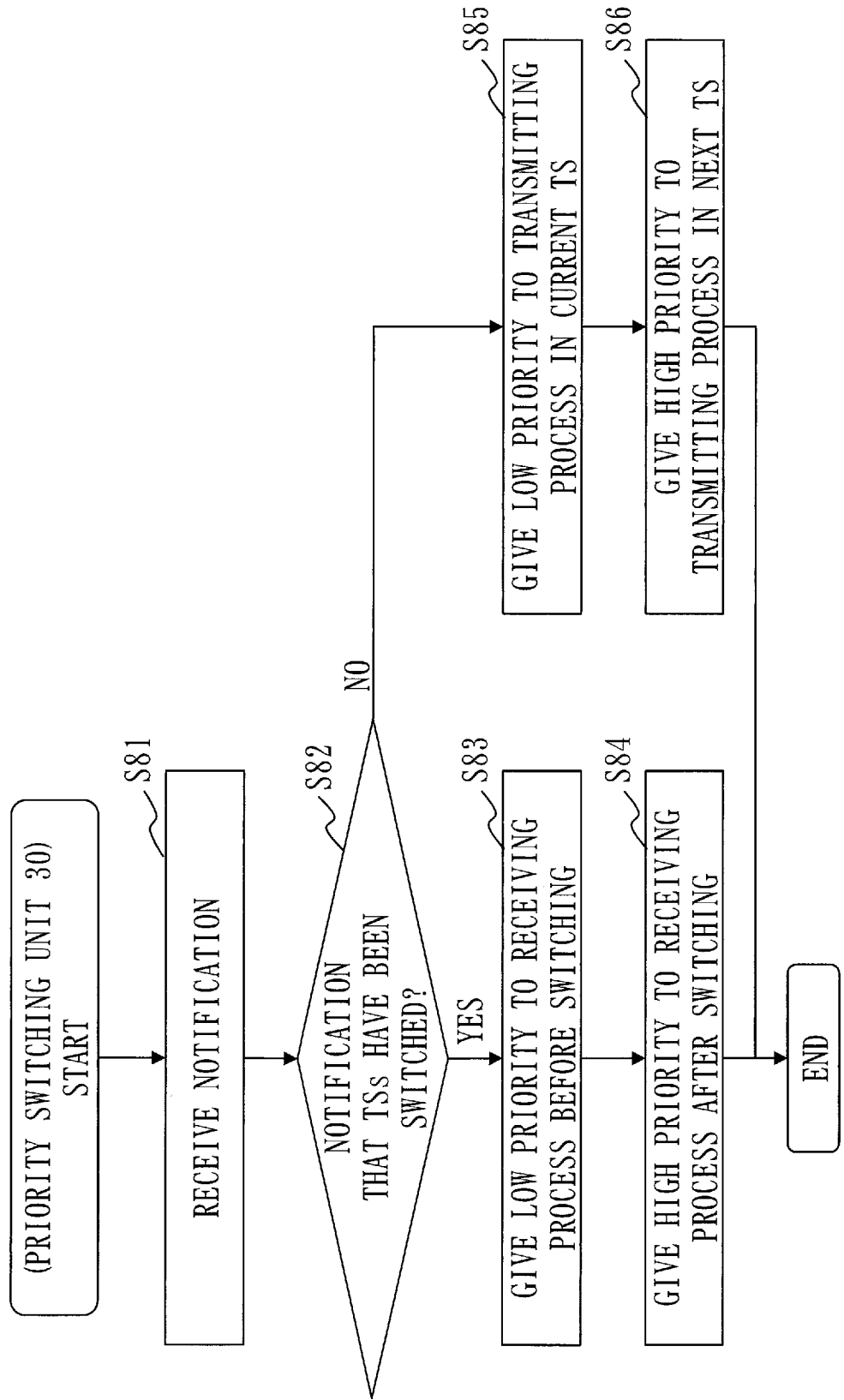

COMMUNICATION DEVICE, COMMUNICATION METHOD AND COMPUTER READABLE MEDIUM

CROSS REFERENCE TO RELATED APPLICATIONS

This application is a Continuation of PCT International Application No. PCT/JP2018/048014, filed on Dec. 27, 2018, which claims priority under 35 U.S.C. 119(a) to Patent Application No. PCT/JP2018/031135, filed in Japan on Aug. 23, 2018, all of which are hereby expressly incorporated by reference into the present application.

TECHNICAL FIELD

The present invention relates to a communication technique in a network in which TSN (Time-Sensitive Networking) technique is used.

BACKGROUND ART

In recent years, the TSN techniques such as IEEE802.1Qbv and IEEE802.1AS have been starting to be applied to communication performed in a control network.

In the TSN technique, a communication period is divided into a plurality of time slots (hereinafter, TS). In each TS, only an assigned type of data is transmitted. The TS is often assigned to each protocol. Each TS is assigned, for example, a TS0 is assigned to IP communication and a TS1 is assigned to FA-network-purpose communication.

On a transmitting side, each data is stored in a transmission queue of the assigned TS, and the data in the queue is sequentially transmitted at a time for which each TS is assigned. The queue is provided by IEEE802.1Qbv. On a receiving side, when the data is received, the data is delivered to a reception task without saving the data in a queue.

In Patent Literature 1, it is described that data transmission/reception required by a high-priority task is prioritized to be performed by giving high priority to a task that performs high-priority communication and giving low priority to a task that performs low-priority communication.

CITATION LIST

Patent Literature

Patent Literature 1: JP11-074946A

SUMMARY OF INVENTION

Technical Problem

If the data has been transmitted at about the end of the time for which each TS is assigned, or if the data has been transmitted in a low-speed network, the data may arrive at the receiving side at a time of a next TS. IEEE802.1Qbv provides a transmission queue but does not provide a reception queue. Therefore, the data is delivered to a reception task during a TS other than the assigned TS, and a process is performed. Then, a process of a task expected to transmit the data during an originally assigned TS is hindered, and the data may not be transmitted at a period at which the data is expected to be transmitted.

When a method of Patent Literature 1 is used, in communication of a task given high priority, it is possible to transmit the data at every period. However, there is a delay in a process of a low-priority task. As a result, it may not be possible to transmit or receive the data assigned to the time slot.

The present invention aims to enable each task to maintain a transmission period.

Solution to Problem

A communication device according to the present invention is a communication device which communicates in a network in which a TSN (Time-Sensitive Networking) technique is used, and the communication device includes:

a time slot management unit to notify that time slots in the TSN technique have been switched; and a data receiving unit to store, when reception data received from other communication devices is not transmission data transmitted during a current time slot, the reception data in a reception data storage unit, and deliver to a reception task, when the time slot management unit notifies that the time slots have been switched, the reception data which is transmission data transmitted during a time slot after being switched and is stored in the reception data storage unit.

Advantageous Effects of Invention

In the present invention, a data receiving unit stores reception data in a reception data storage unit if the reception data is not transmission data transmitted during a current time slot. Then, when time slots are switched, the data receiving unit delivers to a reception task, the reception data which is the transmission data transmitted during a time slot after being switched.

Consequently, the process of the data transmitted during the current time slot is not hindered by influence of the process of the data transmitted during another time slot.

As a result, each task can maintain a transmission period.

BRIEF DESCRIPTION OF DRAWINGS

FIG. 11 is a flowchart of operation of a time slot management unit 21 according to the third embodiment;

FIG. 13 is a flowchart of operation of a time slot management unit 21 according to a fourth embodiment; and FIG. 14 is a flowchart of operation of a priority switching unit 30 according to the fourth embodiment.

DESCRIPTION OF EMBODIMENTS

First Embodiment

*Description of Configuration*

Figure 1:
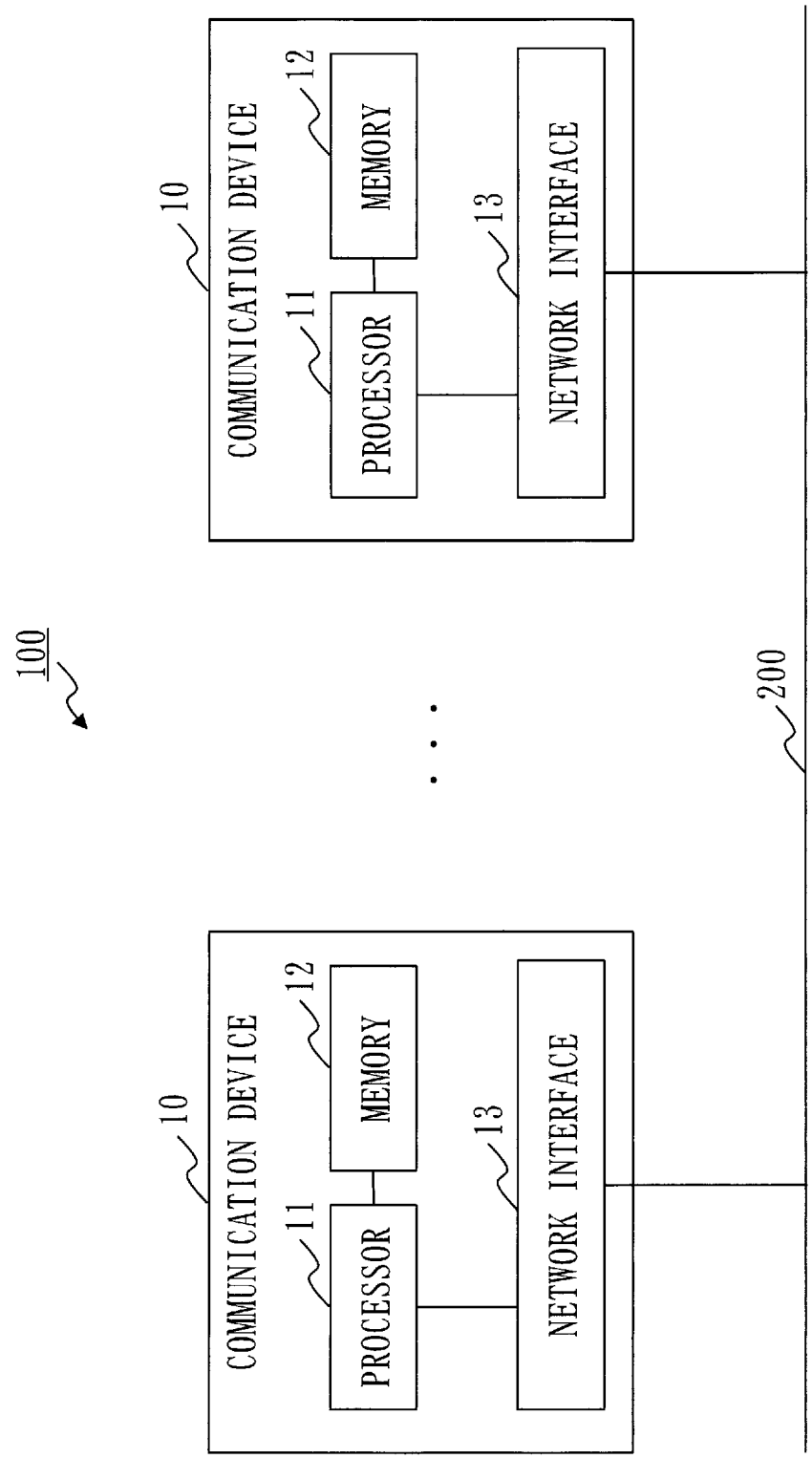
FIG. 1 is a configuration diagram of a communication system 100 according to a first embodiment.

A configuration of a communication system 100 according to a first embodiment will be described with reference to FIG. 1.

The communication system 100 includes a plurality of communication devices 10. Each of the communication devices 10 is connected via a network 200. The network 200 is a network in which a TSN technique is used. Each of the communication devices 10 communicates between other communication devices 10 via the network 200.

Each of the communication devices 10 includes pieces of hardware which are a processor 11, a memory 12, and a network interface 13. The processor 11 is connected to other pieces of hardware via signal lines and controls these other pieces of hardware.

The processor 11 is an IC (Integrated Circuit) that performs processing. Specific examples of the processor 11 are a CPU (Central Processing Unit), a DSP (Digital Signal Processor), and a GPU (Graphics Processing Unit).

The memory 12 is a storage device that stores data. Specific examples of the memory 12 are an SRAM (Static Random Access Memory) and a DRAM (Dynamic Random Access Memory). The memory 12 may be a portable recording medium such as an SD (registered trademark, Secure Digital) memory card, a CF (CompactFlash, registered trademark), an NAND flash, a flexible disk, an optical disk, a compact disk, a Blu-ray (registered trademark) disk, or a DVD (Digital Versatile Disc).

The network interface 13 is an interface for connecting to the network 200. Specific examples of the network interface 13 are ports of Ethernet (registered trademark) and USB (Universal Serial Bus).

Figure 2:
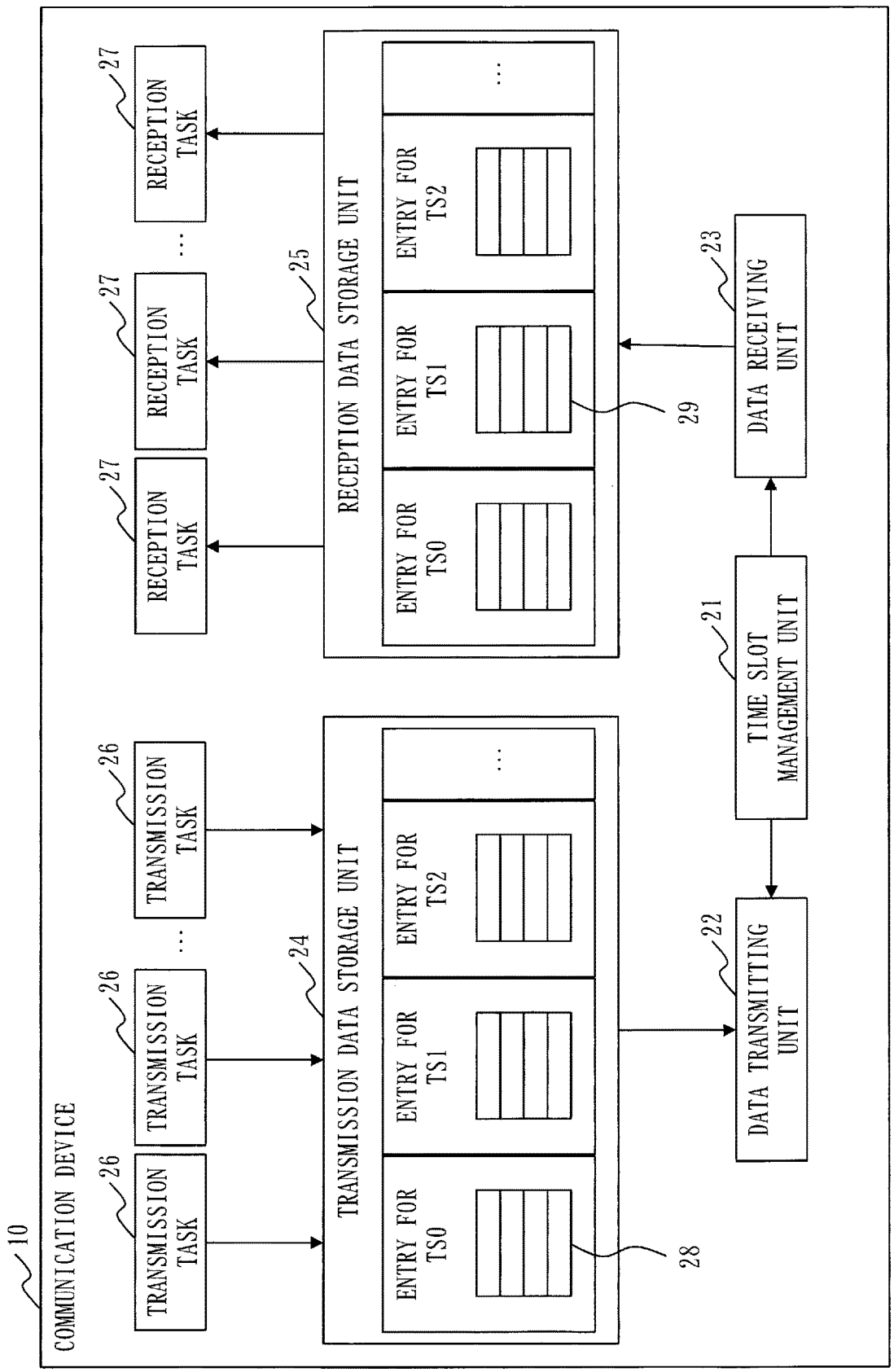
FIG. 2 is a functional configuration diagram of a communication device 10 according to the first embodiment.

A functional configuration of the communication device 10 according to the first embodiment will be described with reference to FIG. 2.

The communication device 10 includes a time slot management unit 21, a data transmitting unit 22, a data receiving unit 23, a transmission data storage unit 24, a reception data storage unit 25, a plurality of transmission tasks 26, and a plurality of reception tasks 27.

The transmission data storage unit 24 has an entry for each TS, and a transmission queue 28 is provided for each entry. In FIG. 2, the transmission data storage unit 24 has an entry for a TS0, an entry for a TS1, an entry for a TS2, and so on, and the transmission queue 28 is provided for each entry. Further, the reception data storage unit 25 has an entry for each TS, and a reception queue 29 is provided for each entry. In FIG. 2, the reception data storage unit 25 has an entry for a TS0, an entry for a TS1, an entry for a TS2, and so on, and the reception queue 29 is provided for each entry.

Functions of the time slot management unit 21, the data transmitting unit 22, the data receiving unit 23, the transmission data storage unit 24, the reception data storage unit 25, the plurality of transmission tasks 26, and the plurality of reception tasks 27 are realized by software. A program that realizes these functions is stored in the memory 12. This program is read and executed by the processor 11.

Consequently, these functions are realized.

Further, the functions of the transmission queue 28 and the reception queue 29 are realized by the memory 12.

*Description of Operation*

Operation of the communication device 10 according to the first embodiment will be described with reference to FIGS. 3 to 5.

The operation of the communication device 10 according to the first embodiment corresponds to a communication method according to the first embodiment. Further, the operation of the communication device 10 according to the first embodiment corresponds to a process of the communication program according to the first embodiment.

As a premise of operation described below, each transmission task 26 delivers the transmission data to the transmission data storage unit 24 when transmission data to be transmitted to the other communication devices 10 is generated. Then, the transmission data storage unit 24 stores the transmission data in the transmission queue 28 provided for an entry for a TS corresponding to the transmission task 26 of a delivery source or the transmission data. Further, when the reception data is delivered from the data receiving unit 23, each of the reception tasks 27 executes a process using the delivered reception data.

The operation of the time slot management unit 21 according to the first embodiment will be described with reference to FIG. 3.

In step S11, the time slot management unit 21 acquires a time. In step S12, the time slot management unit 21 determines whether or not a time of switching TSs has elapsed. When the time of switching TSs has elapsed, the time slot management unit 21 proceeds with the process to step S13. On the other hand, if the time of switching TSs has not elapsed, the time slot management unit 21 returns the process to step S11 and acquires the time again.

In step S13, the time slot management unit 21 notifies the data transmitting unit 22 that the TSs have been switched. Consequently, the time slot management unit 21 causes the data transmitting unit 22 to transmit the transmission data of a TS after being switched. In step S14, the time slot management unit 21 notifies the data receiving unit 23 that the TSs have been switched. Consequently, the time slot management unit 21 causes the data receiving unit 23 to deliver to the reception task 27, the reception data of the TS after being switched.

Operation of the data transmitting unit 22 according to the first embodiment will be described with reference to FIG. 4.

In step S21, the data transmitting unit 22 receives a notification from the time slot management unit 21. In step S22, the data transmitting unit 22 determines whether or not the notification from the time slot management unit 21 is a notification that the TSs have been switched. If the notification is the notification of receiving the notification that the TSs have been switched, the data transmitting unit 22 proceeds with the process to step S23. On the other hand, if the notification is not the notification that the TSs have been switched, the data transmitting unit 22 ends the process.

In step S23, the data transmitting unit 22 treats the TS after being switched as a targeted TS, and transmits to a destination communication device 10, the transmission data stored in the transmission queue 28 provided for the entry for the targeted TS. Besides, the data transmitting unit 22 transmits the stored transmission data to the network 200 towards the destination communication device 10 when new transmission data is stored in the transmission queue 28 provided for the entry for the targeted TS until the data transmitting unit 22 is notified again from the time slot management unit 21 that the TSs have been switched.

Operation of the data receiving unit 23 according to the first embodiment will be described with reference to FIG. 5.

In step S31, the data receiving unit 23 receives from the network interface 13, a notification of a transmission data arrival, or receives from the time slot management unit 21, a notification that the TSs have been switched. The notification of the transmission data arrival is a hardware interrupt or the like. When the data receiving unit 23 receives the notification of the transmission data arrival, the data receiving unit 23 receives the transmission data as the reception data.

In step S32, the data receiving unit 23 determines whether the notification of the transmission data arrival has been received or the notification that the TSs have been switched has been received from the time slot management unit 21 in step S31. When the data receiving unit 23 receives the notification of the transmission data arrival, the data receiving unit 23 proceeds with the process to step S33. On the other hand, when the data receiving unit 23 receives from the time slot management unit 21, the notification that the TSs have been switched, the data receiving unit 23 proceeds with the process to step S36.

In step S33, the data receiving unit 23 determines whether or not the reception data is the transmission data transmitted during a current TS. When the reception data is the transmission data transmitted during the current TS, the data receiving unit 23 proceeds with the process to step S34. On the other hand, if the reception data is not the transmission data transmitted during the current TS, the data receiving unit 23 proceeds with the process to step S35.

In step S34, the data receiving unit 23 delivers the reception data to a corresponding reception task 27. On the other hand, in step S35, the data receiving unit 23 stores the reception data in the reception data storage unit 25. Specifically, the data receiving unit 23 delivers the reception data to the reception data storage unit 25. Then, the reception data storage unit 25 stores the reception data in the reception queue 29 provided for the entry for the TS corresponding to the reception data.

In step S36, the data receiving unit 23 delivers to the corresponding reception task 27, the reception data which is the transmission data transmitted during the TS after being switched and is stored in the reception data storage unit 25. That is, the data receiving unit 23 delivers to the corresponding reception task 27, the reception data stored in the reception queue 29 provided for the entry for the TS after being switched.

*Effect of First Embodiment*

As described above, in the communication device 10 according to the first embodiment, the data receiving unit 23 stores the reception data in the reception data storage unit 25 when the reception data is not the transmission data transmitted during the current TS. Then, when the TSs are switched, the data receiving unit 23 delivers to the reception task 27, the reception data which is the transmission data transmitted during a time slot after being switched.

Consequently, the process of the transmission data transmitted during the current time slot is not hindered by influence of the process of the transmission data transmitted during another time slot. As a result, each task can maintain a transmission period.

In a conventional method, when the reception data is received, the data receiving unit delivers the reception data to the reception task even if the reception data is not the transmission data transmitted during the current TS. Then, the reception task performs the process based on the delivered reception data. As a result, the process of the transmission task and the reception task that performs a process regarding the data transmitted/received during the current TS is hindered.

Figure 6:
FIG. 6 is a diagram illustrating an example of periodic communication when a TSN technique is applied.

FIG. 6 illustrates an example in which periodic communication of 30 seconds is performed, this period is divided into three TSs, and time is allocated to each TS by 10 seconds. In this example, the data held by a transmission task 0 is transmitted during the TS0. Therefore, when this data is inserted into the transmission queue, the data is transmitted directly because a insertion time (00:00:06) is a time within the TS0. The data held by a transmission task 1 is transmitted during the TS1. A time (00:00:31) when this data is inserted into the transmission queue is still the time slot of the TS0. Therefore, this data is temporarily put on standby in the transmission queue, and is transmitted after 00:00:40 which is the time assigned to the TS1.

Figure 7:
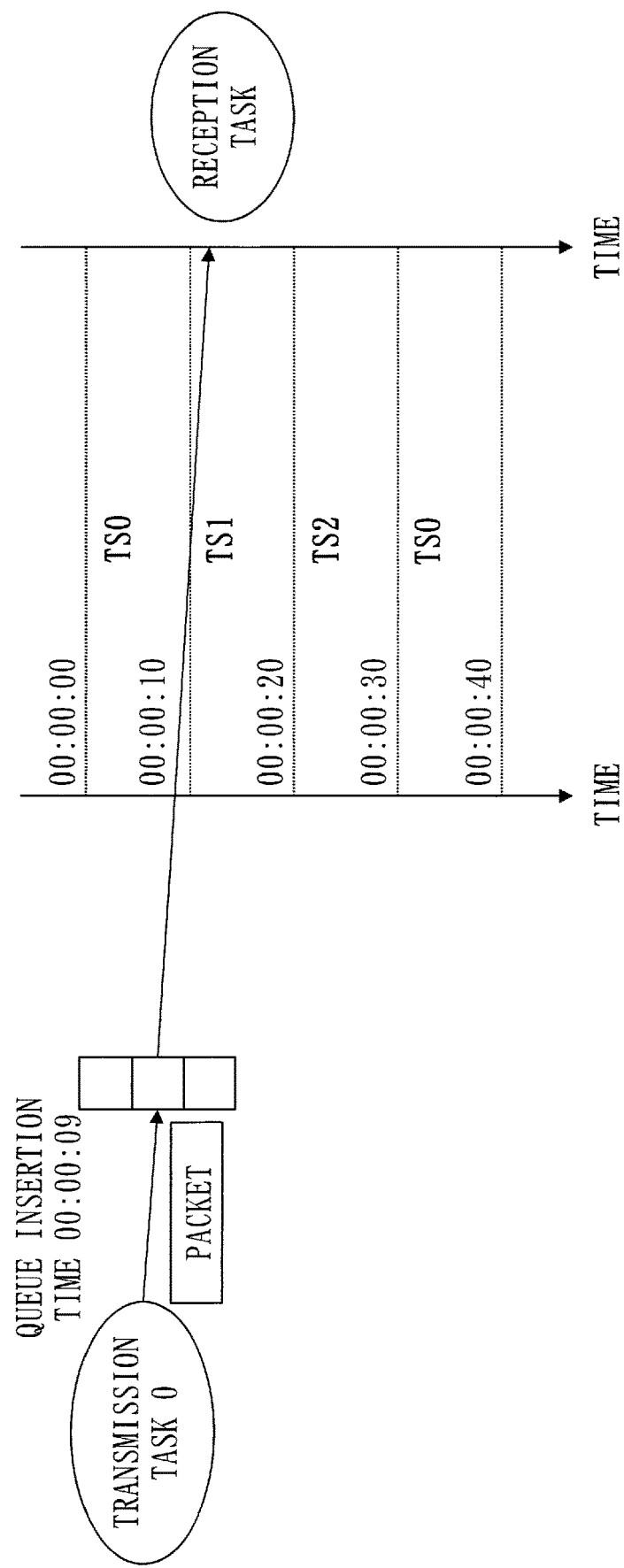
FIG. 7 is a diagram illustrating an example of the periodic communication when the TSN technique is applied.
Figure 8:
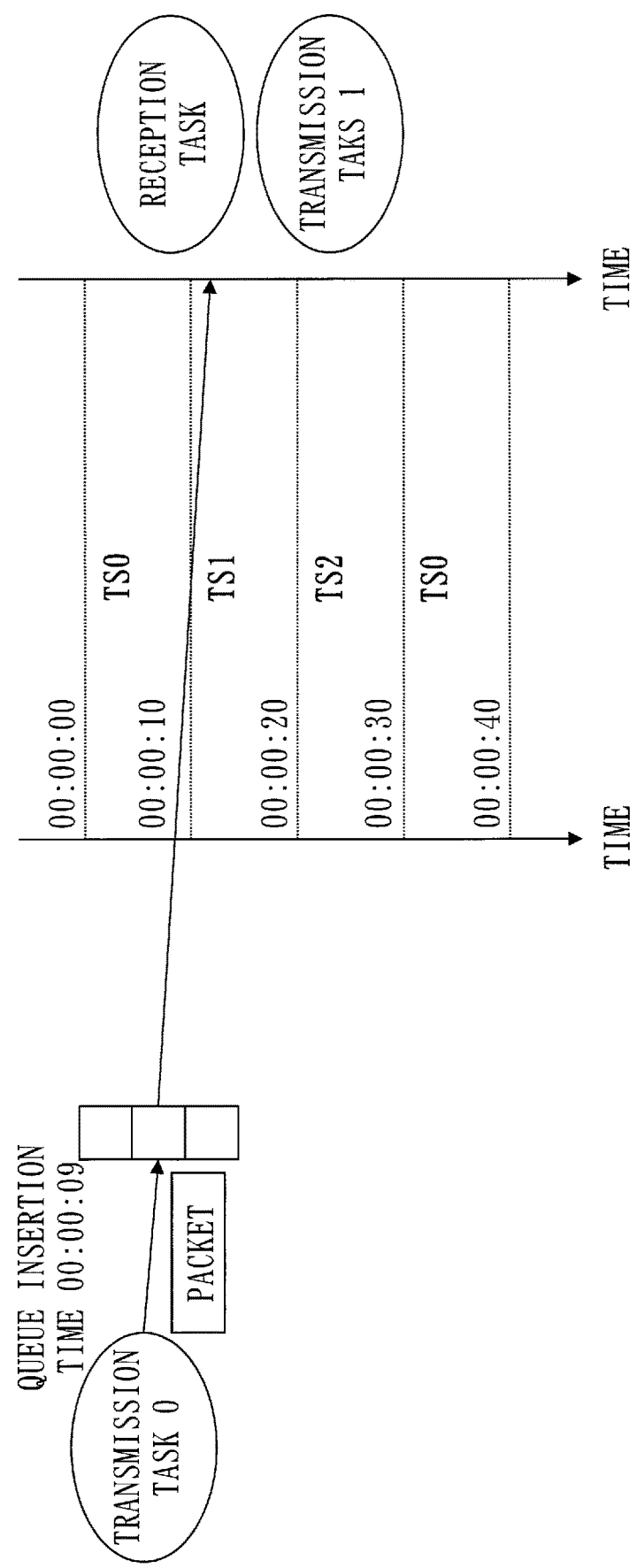
FIG. 8 is a diagram illustrating an example of the periodic communication when the TSN technique is applied.

Here, as illustrated in FIG. 7, when the data is transmitted at about the end of the time assigned to each TS, or when the data is transmitted in a low-speed network, the data may arrive at a receiving side at a time of a next TS. For example, in FIG. 8, when the transmission task 0 transmits the data at the end of the time assigned to the TS0, a time for the reception task to receive the data is the time assigned to the TS1. At that time, if the reception task occupies a CPU resource, the transmission task 1 expected to transmit the data during the TS1 cannot operate, and the insertion of the data into the transmission queue of the TS1 is delayed. If the transmission task 1 should be transmitted every period during the time slot of the TS1, the system requirement cannot be satisfied.

When the reception data is not the transmission data transmitted during the current TS, the communication device 10 according to the first embodiment stores the reception data in the reception data storage unit 25, and the reception data is not delivered to the reception task 27. Therefore, the process of the transmission data transmitted during the current time slot is not hindered by influence of the process of the transmission data transmitted during another time slot.

*Other Configurations*

Modification Example 1

In the first embodiment, it is described that the functions of the time slot management unit 21, the data transmitting unit 22, the data receiving unit 23, the transmission data storage unit 24, the reception data storage unit 25, the plurality of transmission tasks 26, and the plurality of reception tasks 27 are realized by software. However, it is acceptable that these functions are realized by hardware.

When these functions are realized by hardware, the communication device 10 includes an electronic circuit instead of the processor 11. The electronic circuit is a dedicated circuit that realizes these functions.

As the electronic circuit, a single circuit, a composite circuit, a programmed processor, a parallel programmed processor, a logic IC, a GA (Gate Array), an ASIC (Application Specific Integrated Circuit), or an FPGA (Field-Programmable Gate Array) is assumed.

Each functional component may be realized by one electronic circuit, or each functional component may be distributed on a plurality of electronic circuits to be realized.

Modification Example 2

As a modification example 2, some functional components may be realized by hardware, and other functional components may be realized by software.

The processor 11 and the electronic circuit are called processing circuitry. That is, the function of each functional component is realized by the processing circuitry.

Second Embodiment

A second embodiment differs from the first embodiment in that when a processing time required for the reception task 27 to process the reception data is longer than a remaining time in the current TS, the data receiving unit 23 does not deliver the reception data to the reception task 27 and stores the reception data in the reception data storage unit 25. In the second embodiment, these different matters will be described, and the same matters will be omitted.

*Description of Operation*

Figure 9:
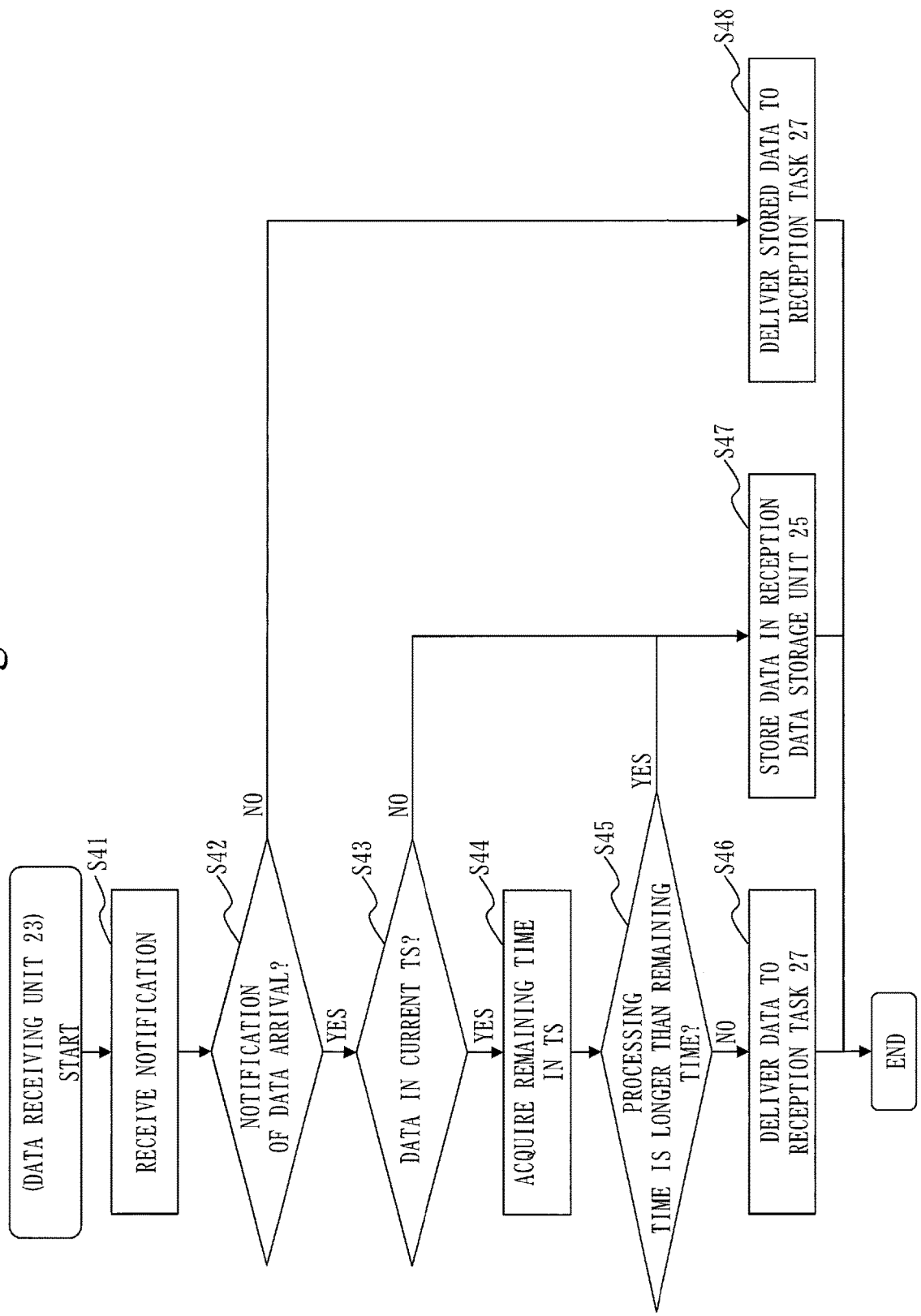
FIG. 9 is a flowchart of operation of a data receiving unit 23 according to a second embodiment.

Operation of the data receiving unit 23 according to the second embodiment will be described with reference to FIG. 9.

Figure 5:
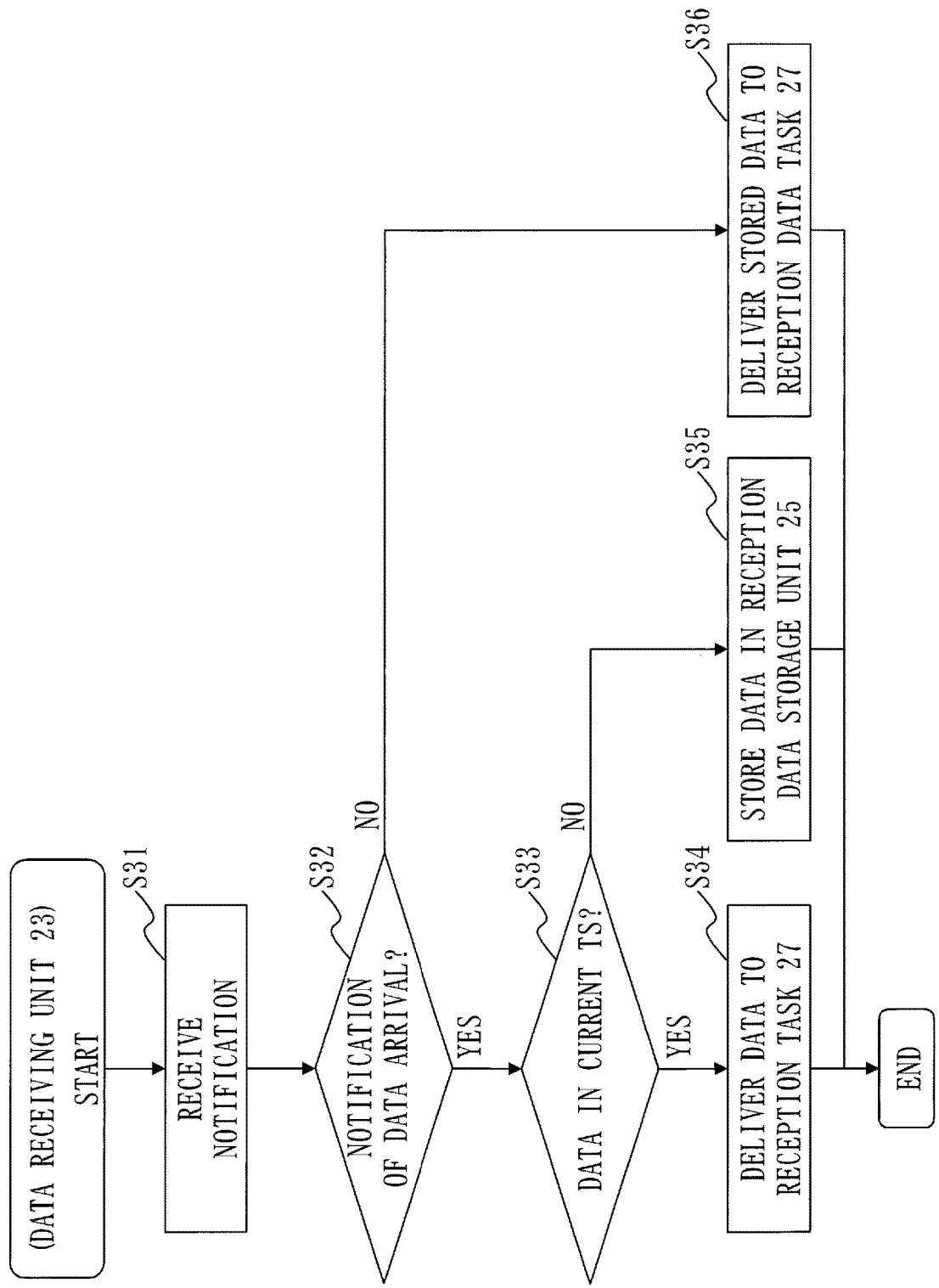
FIG. 5 is a flowchart of operation of a data receiving unit 23 according to the first embodiment.

Processes of steps S41 to S43 are the same as the processes of steps S31 to S33 of FIG. 5. Further, processes of steps S46 to S48 are the same as the processes of steps S34 to S36 of FIG. 5.

Besides, in step S43, if the reception data is the transmission data transmitted during the current TS, the data receiving unit 23 proceeds with the process to step S44. On the other hand, if the reception data is not the transmission data transmitted during the current TS, the data receiving unit 23 proceeds with the process to step S47.

In step S44, the data receiving unit 23 acquires the remaining time in the current TS. Here, the time of the TS is managed by the time slot management unit 21. Therefore, the data receiving unit 23 acquires the remaining time in the current TS by inquiring to the time slot management unit 21.

In step S45, the data receiving unit 23 determines whether or not the processing time required for the reception task 27 to process the reception data is longer than the remaining time in the current TS. The processing time required for the reception task 27 to process the reception data is statistically obtained by pre-measurement or specified by the user designating. When the processing time is shorter than or equal to the remaining time, the data receiving unit 23 proceeds with the process to step S46. On the other hand, when the processing time is longer than the remaining time, the data receiving unit 23 proceeds with the process to step S47.

That is, the data receiving unit 23 delivers the reception data to the reception task 27 when the processing time is shorter than or equal to the remaining time, and stores the reception data in the reception data storage unit 25 when the processing time is longer than the remaining time.

*Effect of Second Embodiment*

As described above, the communication device 10 according to the second embodiment stores the reception data in the reception data storage unit 25 when the processing time is longer than the remaining time. Consequently, the process of the reception task 27 is not completed within the TS, and thus it is possible to prevent the process during the next TS from being hindered.

Third Embodiment

A third embodiment differs from the first and second embodiments in that when the remaining time in the current TS is shorter than the transmission time from transmitting the transmission data until arriving at the other communication devices 10, the transmission process of the transmission data to be transmitted during the current TS is given low priority. In the third embodiment, these different matters will be described, and the same matters will be omitted.

*Description of Configuration*

Figure 10:
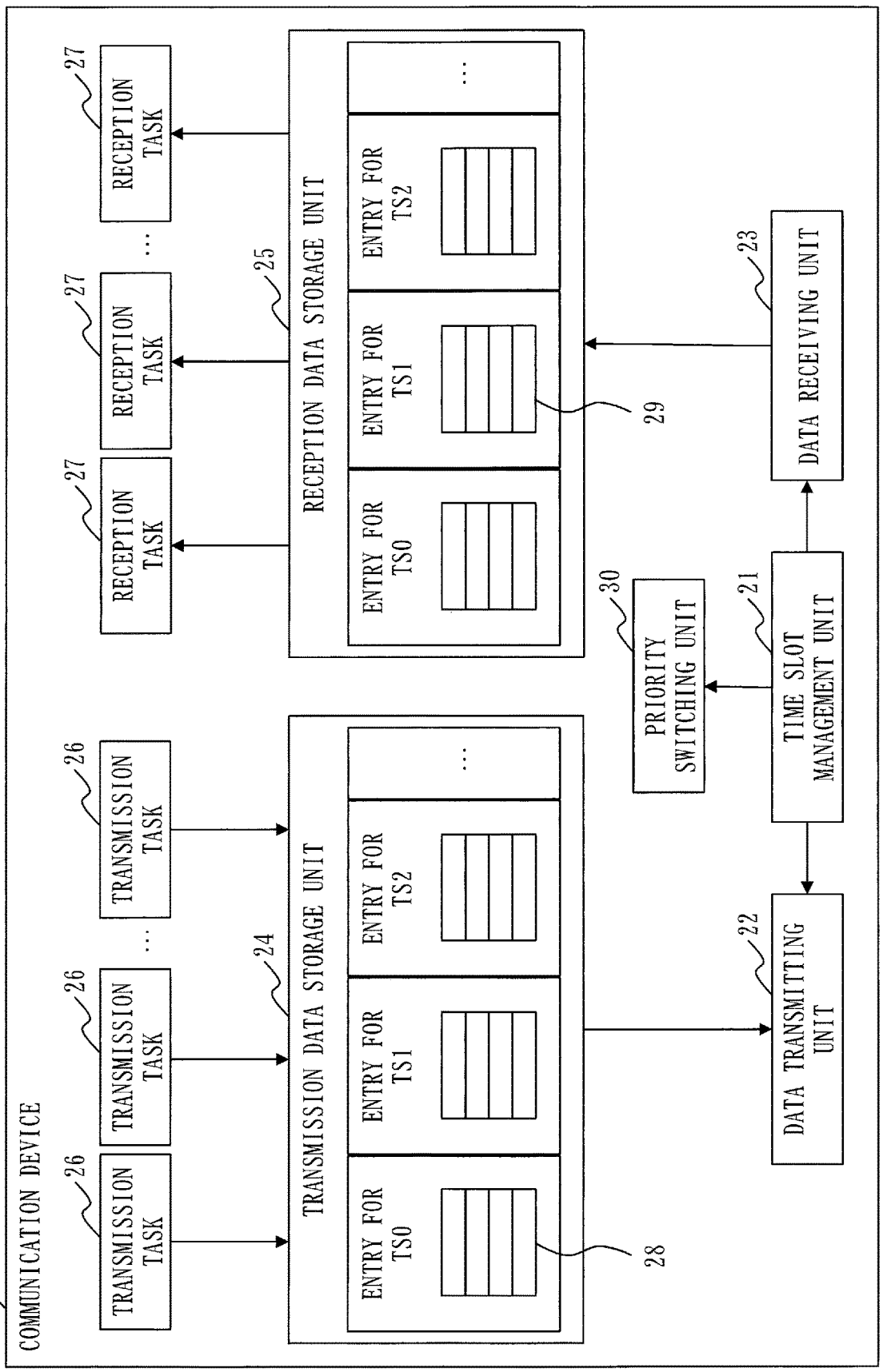
FIG. 10 is a functional configuration diagram of a communication device 10 according to a third embodiment.

A functional configuration of the communication device 10 according to the third embodiment will be described with reference to FIG. 10.

The communication device 10 differs from the communication device 10 according to the first and second embodiments in that a priority switching unit 30 is included in the communication device 10.

*Description of Operation*

As a premise of the operation described below, priority is given to the transmission task 26, and the process is performed by prioritizing the transmission task 26 having a higher priority.

Operation of the time slot management unit 21 according to the third embodiment will be described with reference to FIG. 11.

Figure 3:
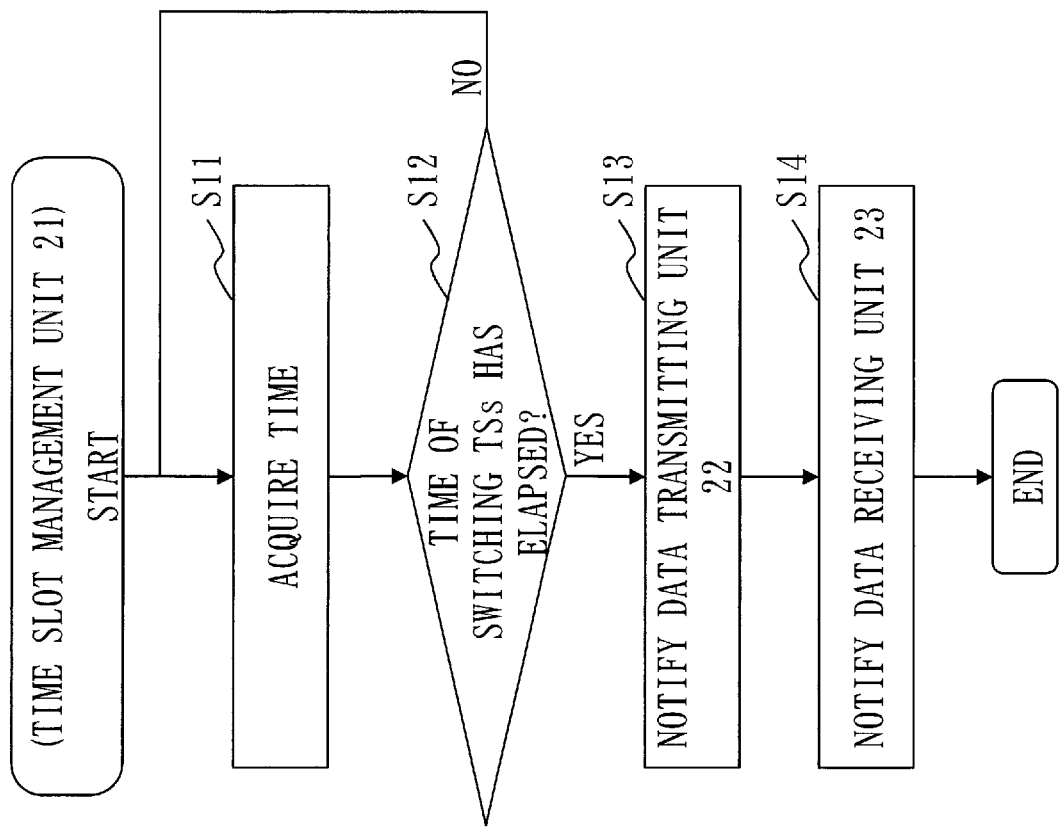
FIG. 3 is a flowchart of operation of a time slot management unit 21 according to the first embodiment.
Figure 4:
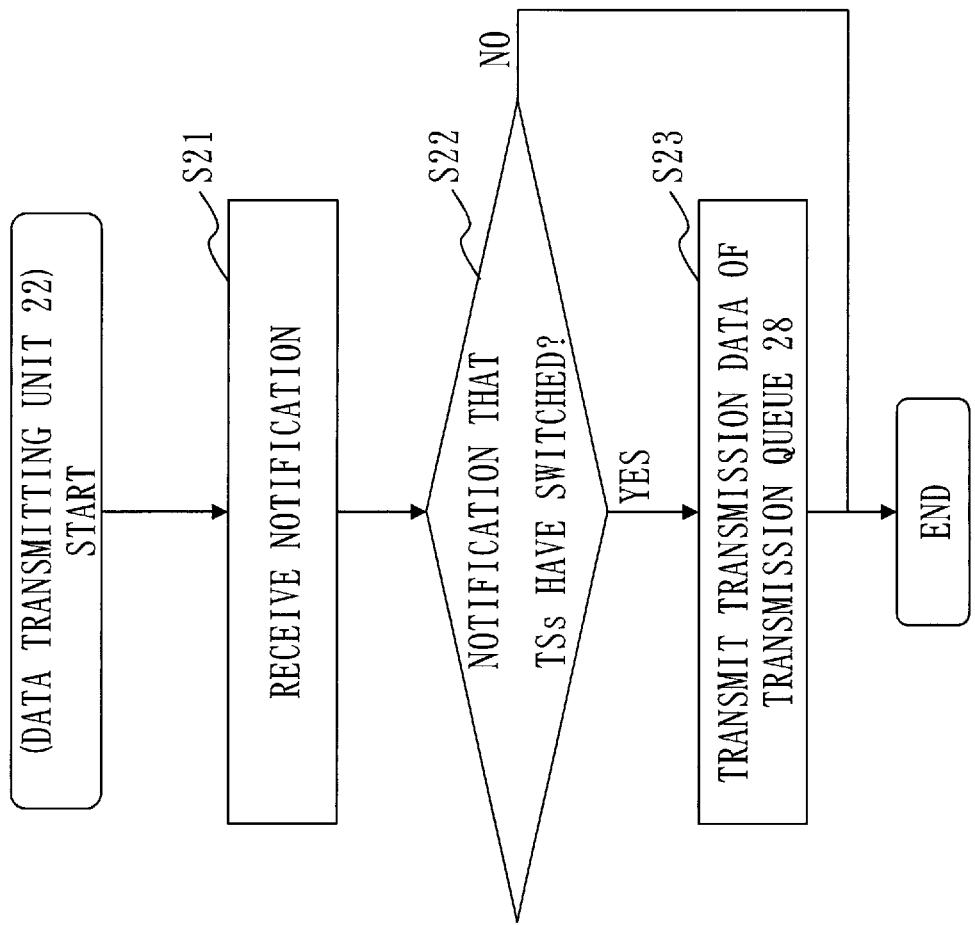
FIG. 4 is a flowchart of operation of a data transmitting unit 22 according to the first embodiment.

Processes of steps S54 to S57 are the same as the processes of steps S11 to S14 of FIG. 3.

In step S51, the time slot management unit 21 acquires the time. In step S52, the time slot management unit 21 determines whether or not the remaining time in the current TS is shorter than a transmission time $\Delta t$ from transmitting the transmission data until arriving at the other communication devices 10. When the remaining time is shorter than the transmission time $\Delta t$, the time slot management unit 21 proceeds with the process to step S53. On the other hand, when the remaining time is equal to or more than the transmission time $\Delta t$, the time slot management unit 21 returns the process to step S51 and acquires the time again.

In step 53, the time slot management unit 21 notifies the priority switching unit 30 that the remaining time is shorter than the transmission time $\Delta t$. Consequently, the time slot management unit 21 causes the priority switching unit 30 to switch priorities of the transmission process.

Operation of the priority switching unit 30 according to the third embodiment will be described with reference to FIG. 12.

In step S61, the priority switching unit 30 receives a notification from the time slot management unit 21. In step S62, the priority switching unit 30 determines whether or not the notification from the time slot management unit 21 is a notification that the remaining time in the current TS is shorter than the transmission time $\Delta t$. If the notification is the notification that the remaining time in the current TS is shorter than the transmission time $\Delta t$, the priority switching unit 30 proceeds with the process to step S63. On the other hand, if the notification is not the notification that the remaining time in the current TS is shorter than the transmission time $\Delta t$, the priority switching unit 30 ends the process.

In step S63, the priority switching unit 30 gives low priority to the transmission process of the transmission data to be transmitted during the current TS. Specifically, the priority switching unit 30 gives the low priority to the transmission task 26 that performs the transmission process during the current TS. In step S64, the priority switching unit 30 gives high priority to the transmission process of the transmission data to be transmitted during the next TS. Specifically, the priority switching unit 30 gives the high priority to the transmission task 26 that performs the transmission process during the next TS.

Consequently, the transmission task 26 that performs the transmission process during the next TS is prioritized to be processed over the transmission task 26 that performs the transmission process during the current TS.

*Effect of Third Embodiment*

As described above, the communication device 10 according to the third embodiment gives the low priority to the transmission task 26 that performs the transmission process during the current TS when the remaining time in the current TS is shorter than the transmission time Δt. Consequently, the transmission process in which the process is not completed during the current TS is executed less frequently, and thus it is possible to prevent the process of the next TS from being hindered.

Fourth Embodiment

A fourth embodiment differs from the first to third embodiments in that when the TSs are switched, the low priority is given to the reception process of the reception data which is the transmission data transmitted during the TS before being switched. In the fourth embodiment, these different matters will be described, and the same matters will be omitted.

Besides, here, a case in which functions are added to the third embodiment will be described. However, it is also possible to add the functions to the first and second embodiments.

*Description of Operation* As a premise of the operation described below, a priority is given to the reception task 27, and the process is performed by prioritizing the reception task 27 having the higher priority.

Operation of the time slot management unit 21 according to the fourth embodiment will be described with reference to FIG. 13.

Processes of steps S71 to S76 are the same as the processes of steps S51 to S56 of FIG. 11. Further, a process of step S78 is the same as the process of step S57 of FIG. 11.

In step S77, the time slot management unit 21 notifies the priority switching unit 30 that the TSs have been switched. Consequently, the time slot management unit 21 causes the priority switching unit 30 to switch priorities of the reception process.

Operation of the priority switching unit 30 according to the fourth embodiment will be described with reference to FIG. 14.

Figure 12:
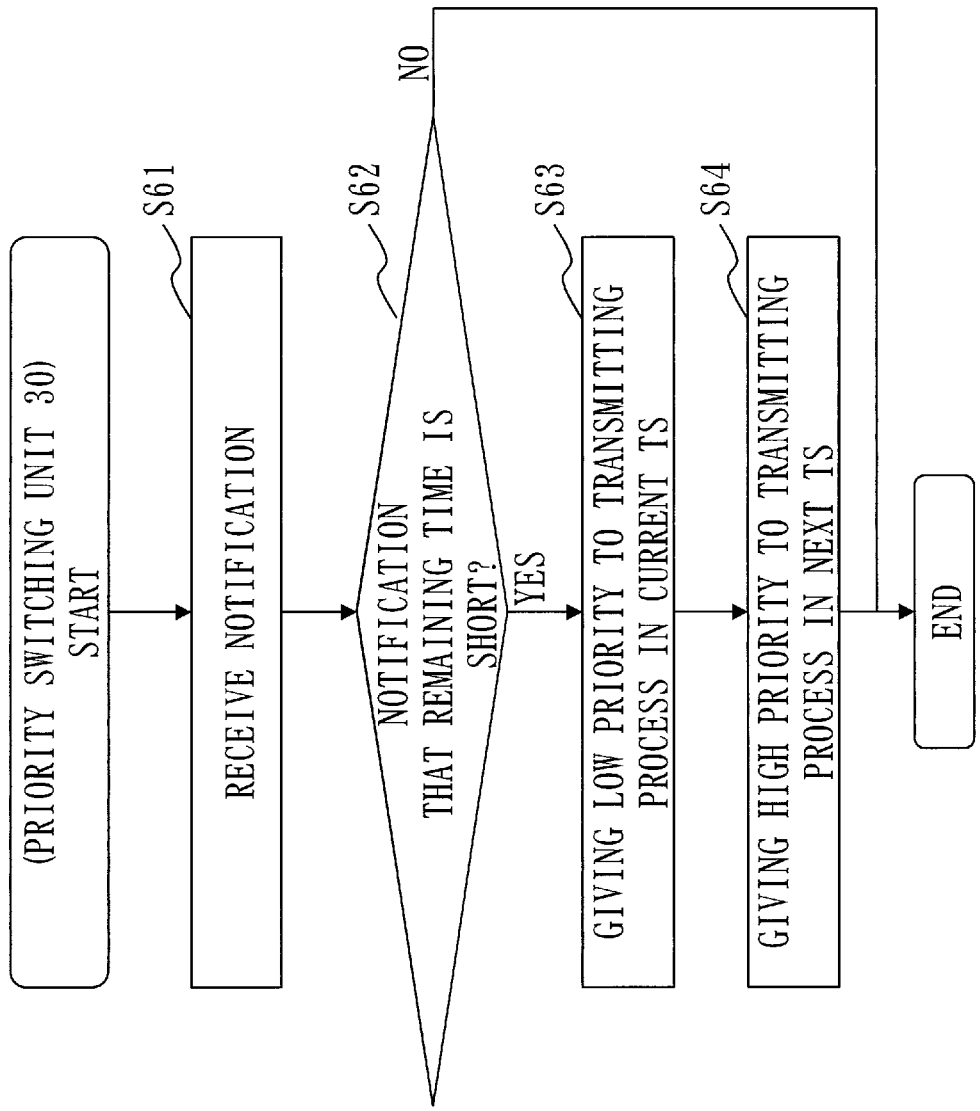
FIG. 12 is a flowchart of operation of a priority switching unit 30 according to the third embodiment.

A process of step S81 is the same as the process of step S61 of FIG. 12. Further, processes of steps S85 to S86 are the same as the processes of steps S63 to S64 of FIG. 12.

In step S82, the priority switching unit 30 determines whether the notification from the time slot management unit 21 is a notification that the TSs have been switched or a notification that the remaining time is shorter than the transmission time Δt. If the notification is the notification that the TSs have been switched, the priority switching unit 30 proceeds with the process to step S83. On the other hand, when the notification is the notification that the remaining time is shorter than the transmission time Δt, the priority switching unit 30 proceeds with the process to step S85.

In step S83, the priority switching unit 30 gives the low priority to the reception process of the reception data which is the transmission data transmitted during the TS before being switched. Specifically, the priority switching unit 30 gives the low priority to the reception task 27 that performs the reception process during the TS before being switched. In step S84, the priority switching unit 30 gives the high priority to the reception process of the reception data which is the transmission data transmitted during the TS after being switched. Specifically, the priority switching unit 30 gives the high priority to the reception task 27 that performs the reception process during the TS after being switched.

Consequently, the reception task 27 that performs the reception process during the current TS is prioritized to be processed over the reception task 27 that performs the reception process during the TS before being switched.

*Effect of Fourth Embodiment*

As described above, when the TSs are switched, the communication device 10 according to the fourth embodiment gives the low priority to the reception process of the reception data which is the transmission data transmitted during the TS before being switched. Consequently, the reception process in which the process has not been completed in a previous TS is not executed, and thus it is possible to prevent the process of the current TS from being hindered.

REFERENCE SIGNS LIST

10: communication device, 11: processor, 12: memory, 13: network interface, 21: time slot management unit, 22: data transmitting unit, 23: data receiving unit, 24: transmission data storage unit, 25: reception data storage unit, 26: transmission task, 27: reception task, 28: transmission queue, 29: reception queue, 30: priority switching unit, 100: communication system, 200: network.

The invention claimed is:

1. A communication device communicating in a network in which a TSN (Time-Sensitive Networking) technique is used to transmit and receive data among a plurality of communication devices, the TSN technique dividing a communication period into a plurality of time slots, where during each time slot only data corresponding to an assigned type is transmitted, the communication device comprising:
  a plurality of transmission queues, each associated with a corresponding time slot and storing data to be transmitted during the corresponding time slot;
  a plurality of reception queues, each associated with a corresponding time slot and storing reception data transmitted from other communication devices during the corresponding time slot; and
  processing circuitry
    to notify that time slots in the TSN technique have been switched;
    to notify that reception data has been received; and
    to determine, upon notification that reception data has been received, whether the reception data corresponds to transmission data transmitted from an other communication device during the current time slot;
    to store, when it is determined that the reception data does not correspond to transmission data transmitted during the current time slot, the reception data in the reception queue associated with the time slot when the corresponding transmission data was transmitted from the other communication device; and
    to deliver to a reception task, upon notification that the time slots have been switched, the reception data stored in the reception queue associated with the switched to time slot.

2. The communication device according to claim 1, wherein, when it is determined that the reception data corresponds to transmission data transmitted during the current time slot, the processing circuitry delivers the reception data to the reception task during the current time slot.

3. The communication device according to claim 1, wherein, when it is determined that the reception data corresponds to transmission data transmitted during the current time slot, the processing circuitry is further configured to
- determine whether a processing time required for the reception task to process the reception data is longer than a remaining time in the current time slot; and
- store, upon determination that the processing time is longer than the remaining time, the reception data in the reception queue corresponding to the current time slot.

4. The communication device according to claim 3, wherein, upon determination that the processing time is shorter than or equal to the remaining time, the processing circuitry delivers the reception data to the reception task during the current time slot.

5. The communication device according to claim 1, wherein the processing circuitry
- notifies that the remaining time in the current time slot is shorter than transmission time from transmitting the transmission data until arriving at the other communication devices, and
- transmits the transmission data to the other communication devices, and gives low priority to a transmission process of the transmission data to be transmitted during the current time slot and gives high priority to a transmission process of the transmission data to be transmitted during a next time slot when it is notified that the remaining time is shorter than the transmission time.

6. The communication device according to claim 2, wherein the processing circuitry notifies that the remaining time in the current time slot is shorter than transmission time from transmitting the transmission data until arriving at the other communication devices, and
- transmits the transmission data to the other communication devices, and gives low priority to a transmission process of the transmission data to be transmitted during the current time slot and gives high priority to a transmission process of the transmission data to be transmitted during a next time slot when it is notified that the remaining time is shorter than the transmission time.

7. The communication device according to claim 3, wherein the processing circuitry notifies that the remaining time in the current time slot is shorter than transmission time from transmitting the transmission data until arriving at the other communication devices, and
- transmits the transmission data to the other communication devices, and gives low priority to a transmission process of the transmission data to be transmitted during the current time slot and gives high priority to a transmission process of the transmission data to be transmitted during a next time slot when it is notified that the remaining time is shorter than the transmission time.

8. The communication device according to claim 4, wherein the processing circuitry notifies that the remaining time in the current time slot is shorter than transmission time from transmitting the transmission data until arriving at the other communication devices, and
- transmits the transmission data to the other communication devices, and gives low priority to a transmission process of the transmission data to be transmitted during the current time slot and gives high priority to a transmission process of the transmission data to be transmitted during a next time slot when it is notified that the remaining time is shorter than the transmission time.

9. The communication device according to claim 1, wherein when it is notified that the time slots have been switched, the processing circuitry gives high priority to a reception process of reception data which is the transmission data transmitted during a time slot after being switched and gives low priority to a reception process of reception data which is the transmission data transmitted during a time slot before being switched.

10. The communication device according to claim 2, wherein when it is notified that the time slots have been switched, the processing circuitry gives high priority to a reception process of reception data which is the transmission data transmitted during a time slot after being switched and gives low priority to a reception process of reception data which is the transmission data transmitted during a time slot before being switched.

11. The communication device according to claim 3, wherein when it is notified that the time slots have been switched, the processing circuitry gives high priority to a reception process of reception data which is the transmission data transmitted during a time slot after being switched and gives low priority to a reception process of reception data which is the transmission data transmitted during a time slot before being switched.

12. The communication device according to claim 4, wherein when it is notified that the time slots have been switched, the processing circuitry gives high priority to a reception process of reception data which is the transmission data transmitted during a time slot after being switched and gives low priority to a reception process of reception data which is the transmission data transmitted during a time slot before being switched.

13. The communication device according to claim 5, wherein when it is notified that the time slots have been switched, the processing circuitry gives high priority to a reception process of reception data which is the transmission data transmitted during a time slot after being switched and gives low priority to a reception process of reception data which is the transmission data transmitted during a time slot before being switched.

14. The communication device according to claim 6, wherein when it is notified that the time slots have been switched, the processing circuitry gives high priority to a reception process of reception data which is the transmission data transmitted during a time slot after being switched and gives low priority to a reception process of reception data which is the transmission data transmitted during a time slot before being switched.

15. The communication device according to claim 7, wherein when it is notified that the time slots have been switched, the processing circuitry gives high priority to a reception process of reception data which is the transmission data transmitted during a time slot after being switched and gives low priority to a reception process of reception data which is the transmission data transmitted during a time slot before being switched.

16. The communication device according to claim 8, wherein when it is notified that the time slots have been switched, the processing circuitry gives high priority to a reception process of reception data which is the transmission data transmitted during a time slot after being switched and gives low priority to a reception process of reception data which is the transmission data transmitted during a time slot before being switched.

17. A communication method for communicating in a network in which a TSN (Time-Sensitive Networking) technique is used to transmit and receive data among a plurality of communication devices, the TSN technique dividing a communication period into a plurality of time slots, where during each time slot only data corresponding to an assigned type is transmitted, the communication method comprising:
- associating each of a plurality of transmission queues with a corresponding time slot for storing data to be transmitted during the corresponding time slot;
- associating each of a plurality of reception queues with a corresponding time slot for storing reception data transmitted from other communication devices during the corresponding time slot;
- notifying, that time slots in the TSN technique have been switched;
- notifying that reception data has been received; and
- determining, upon notification that reception data has been received, whether the reception data corresponds to transmission data transmitted from an other communication device during the current time slot;
- storing, when it is determined that the reception data does not correspond to transmission data transmitted during the current time slot, the reception data in the reception queue associated with the time slot when the corresponding transmission data was transmitted from the other communication device; and
- delivering to a reception task, upon notification that the time slots have been switched, the reception data stored in the reception queue associated with the switched to time slot.

18. A non-transitory computer readable medium storing a communication program communicating in a network in which a TSN (Time-Sensitive Networking) technique is used to transmit and receive data among a plurality of communication devices, the TSN technique dividing a communication period into a plurality of time slots, where during each time slot only data corresponding to an assigned type is transmitted, the communication program which causes a computer to execute:
- an association process of associating each of a plurality of transmission queues with a corresponding time slot for storing data to be transmitted during the corresponding time slot and associating each of a plurality of reception queues with a corresponding time slot for storing reception data transmitted from other communication devices during the corresponding time slot;
- a time slot management process of notifying that time slots in the TSN technique have been switched or notifying that reception data has been received;
- a transmission determination process of determining, upon notification that reception data has been received, whether the reception data corresponds to transmission data transmitted from an other communication device during the current time slot; and
- a data receiving process of storing, when it is determined that the reception data does not correspond to transmission data transmitted during the current time slot, the reception data in the reception queue associated with the time slot corresponding to when transmission data was transmitted from the other communication device, and
- a reception task delivery process of delivering to a reception task, upon the time slot management process notifying that the time slots have been switched, the reception data stored in the reception queue associated with the switched to time slot.

* * * * *